Aug. 8, 1950 K. M. GAVER 2,518,135
UNIFORMLY 2-SUBSTITUTED GLUCOPYRANOSE POLYMERS
Filed Nov. 1, 1946 2 Sheets-Sheet 1

INVENTOR
KENNETH M. GAVER
BY
Toulmin & Toulmin
ATTORNEY

Aug. 8, 1950 K. M. GAVER 2,518,135
UNIFORMLY 2-SUBSTITUTED GLUCOPYRANOSE POLYMERS
Filed Nov. 1, 1946 2 Sheets-Sheet 2
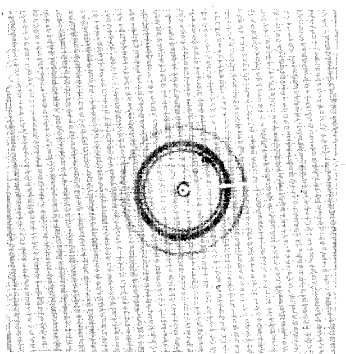
Fig. 4.
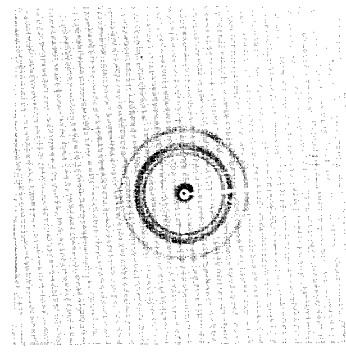
Fig. 5.
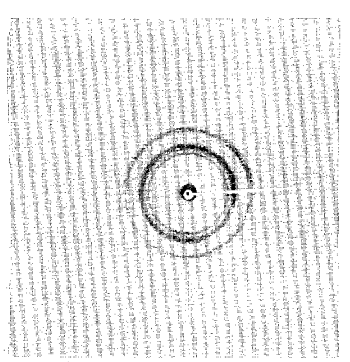
Fig. 6.
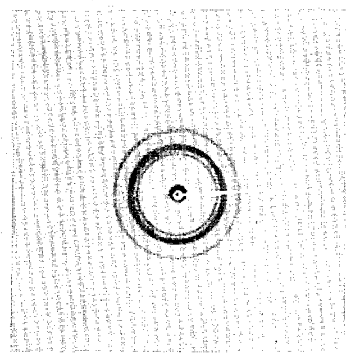
Fig. 7.
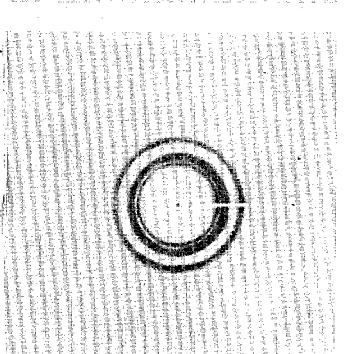
Fig. 8.
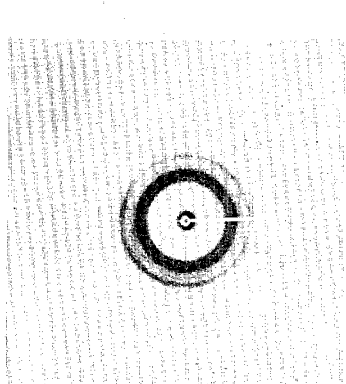
Fig. 9.
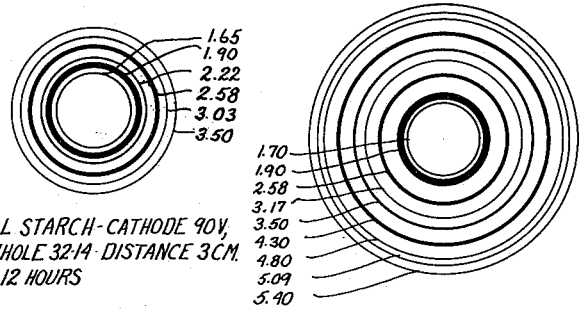
Fig. 10.
ORIGINAL STARCH-CATHODE 90V,
10 MA-PINHOLE 32-14 DISTANCE 3CM.
TIME 12 HOURS
1.65
1.90
2.22
2.58
3.03
3.50
Fig. 11.
NA-STARCH-CATHODE 92 V,
12 MA. PINHOLE 32-14
DISTANCE 3CM. TIME 12 HOURS
1.70
1.90
2.58
3.17
3.50
4.30
4.80
5.09
5.40
INVENTOR
KENNETH M. GAVER
BY Toulmin & Toulmin
ATTORNEY Patented Aug. 8, 1950

2,518,135

UNITED STATES PATENT OFFICE 2,518,135

UNIFORMLY 2-SUBSTITUTED GLUCO-PYRANOSE POLYMERS

Kenneth M. Gaver, Columbus, Ohio, assignor to The Ohio State University Research Foundation, Columbus, Ohio, a corporation of Ohio Application November 1, 1946, Serial No. 707,318

32 Claims. (Cl. 260—209)

This invention relates to new compounds of starches, and more particularly to 2-mono starchates (alcoholates), and their method of preparation.

This application is a continuation-in-part of my application, Serial No. 357,995, filed September 23, 1940, now abandoned.

It might be well to mention that the term starchate is to comprise all compounds composed of any number of polymerized glucopyranose units wherein one or more metallic or nonmetallic atoms or inorganic or organic radicals are substituted for the hydrogen atoms of one or more of the several hydroxyl groups of the starch unit so as to form a polymerized compound which in fact is (or is at least analogous to) an alcoholate of starch.

It has been known, heretofore, that starch may be modified by treatment with aqueous solutions of alkalies, alkaline salts, alkaline earth hydroxides and other hydroxides to produce starch products wherein a certain amount of alkali, alkaline salt, alkaline earth hydroxide or other hydroxide is adsorbed on the oxygen bridges within the building units, i. e. on the 1,5-pyranose ring replacing the co-ordinated water in an equimolecular proportion. It has long been known that water as such was a natural constituent of the starch molecule and thermal decomposition data indicates that this water is present as coordinated water, the generally accepted position of this coordination being on the oxygen bridge of the 1,5-pyranose ring. Treatment in aqueous media with various metallic hydroxides is conducive to ion exchange whereby the metallic hydroxide replaces the water of co-ordination. Various co-ordinated compounds have been reported as having compositions represented by the following formulas:

$C_{12}H_{20}O_{10}\cdot NaOH$      $C_{12}H_{20}O_{10}\cdot Ba(OH)_2$
$2C_{12}H_{20}O_{10}\cdot NaOH$     $2C_{12}H_{20}O_{10}\cdot Ba(OH)_2$
$3C_{12}H_{20}O_{10}\cdot NaOH$     $3C_{12}H_{20}O_{10}\cdot Ba(OH)_2$ Similar compounds of barium, calcium, strontium, magnesium, zinc, aluminum, copper, iron, lead, either alone or in combination with other metals, have been reported. The inability of the various investigators to make these compounds undergo the Williamson ether reaction is proof of their co-ordinated nature. These compounds have a very high viscosity and show a tendency to decompose during storage, during drying, etc. which becomes apparent from the dark color the solution of a product thus treated has. Obviously, in all these previous cases, the product formed was not a compound in the strictest sense but rather co-ordinated complexes of poorly defined nature.

I have discovered that where starch is reacted, preferably by refluxing, with a non-aqueous, instead of an aqueous, solution of alkali hydroxide, a product entirely different from the above-mentioned known so-called alkali starchates was obtained. The new product does not have the characteristic of high viscosity which alkali starch has.

In order to obtain more information about the reaction taking place in non-aqueous solution, the products obtained were analyzed with regard to the alkali taken up by the product at various concentrations of the sodium hydroxide. For this purpose a series of 2 gram samples of rice starch (equivalent to 1.8 grams of pure starch) were dried for one hour at 130° C. to remove the moisture, and each was then treated with 25 cc. of a solution of NaOH and ethyl alcohol and the mixture allowed to react at reflux temperature for one hour.

The results of these tests are shown in the following Table I and in a strictly diagrammatic manner in Fig. 1.

TABLE I

| Sample No. | gms. NaOH original | gms. NaOH reacted (per gm.) | Per Cent NaOH |
|---|---|---|---|
| 1 | 0.000 | | 0.00 |
| 2 | 0.209 | 0.0844 | 7.8 |
| 3 | 0.418 | 0.121 | 10.7 |
| 4 | 0.627 | 0.135 | 11.5 |
| 5 | 0.836 | 0.144 | 12.3 |
| 6 | 1.045 | 0.155 | 13.0 |
| 7 | 1.254 | 0.164 | 13.8 |
| 8 | 1.463 | 0.181 | 15.3 |
| 9 | 1.672 | 0.177 | |
| 10 | 1.881 | 0.189 | 16.0 |
| 11 | 2.090 | 0.185 | 15.9 |
| 12 | 2.300 | 0.154 | |
| 13 | 2.508 | 0.206 | 17.3 |
| 14 | 2.717 | 0.207 | 17.3 |
| 15 | 2.936 | 0.216 | 17.1 |
| 16 | 3.135 | 0.215 | 17.1 |
| 17 | 5.340 | 1.211 | decomp. |

As is obvious from Figure 1 and also from the table, a definite break in the reaction takes place, this point of break corresponding to 16% NaOH in rice starch which when corrected for β-amylose gives a value of 19.8%. The values of 17% indicate the presence of $Na_2CO_3$ impurity.

When the amount of NaOH is increased above that indicated in sample No. 16 (Table I), decomposition of the product is brought about, as shown by a break in the pH value. This indicates that when a certain proportion of NaOH and starch is treated together under certain conditions, a reaction between the NaOH and starch is effected which is different from the intermediate product formed whereby NaOH is merely adsorbed on the particles of starch. It will be also seen from the horizontal part of the diagram that the sodium taken up by the product remains constant at a certain value. This value corresponds to one molecule of sodium for each glucose residue. In other words, regardless of the concentration of the sodium hydroxide solution used, the end product always is a mono-substitution product, provided that there is sufficient sodium hydroxide for the reaction to occur.

A great number of additional tests was then carried out in order to find out more about the chemism of the reaction between starch and sodium hydroxide in alcoholic solution. These experiments led to the following conclusions:

Every non-aqueous solvent which would dissolve sodium hydroxide to a concentration of 0.04 N or higher would yield the same product with respect to weight yield and analysis of the product. Thus, the following alcohols have been found suitable for my process:

allyl
iso-amyl
n-amyl
sec.-amyl
anisyl
benzhydrol
benzoylcarbinol
benzyl
2,3-butanediol
n-butyl
iso-butyl
sec.-butyl
tert.-butyl
sec.-butyl carbinol
$\beta$-(p-tert. butyl phenoxy) ethyl
capryl
ceryl
cetyl
3-chloro-2-propenol-1
cinnamic
crotyl
cyclohexanol
decyl
diacetone
diethyl carbinol
dimethyl benzyl carbinol
dimethyl ethynyl carbinol
dimethyl n-propyl carbinol
dimethyl isopropyl carbinol
di-n-propyl carbinol
di-iso-propyl carbinol
ethyl
2-ethyl butyl
2-ethyl hexanol
furfuryl
n-heptyl
n-hexyl
sec.-hexyl
trimethylene glycol
lauryl
methallyl
methyl
methyl amyl
methyl butyl carbinol
o-methyl cyclohexanol
m-methyl cyclohexanol
p-methyl cyclohexanol
2-methyl pentanol-1
methyl isopropyl carbinol
n-nonyl
n-octyl
octanol-2
phenyl-propyl
tert.-amyl
n-propyl
iso-propyl
tetrahydrofurfuryl
triethyl carbinol
triphenyl carbinol
ethylene glycol
ethylene glycol monomethyl ether
ethylene glycol monoethyl ether
ethylene glycol monobenzyl ether
ethylene glycol monobutyl ether
diethylene glycol
diethylene glycol monomethyl ether
glycerol
glycerol $\alpha$-n-butyl ether
glycerol $\alpha,\alpha'$-dimethyl ether
glycerol $\alpha,\gamma$-diphenyl ether
glycerol $\alpha$-monomethyl ether
hexamethylene glycol
2-methyl 2,4-pentanediol
diethylene glycol monoethyl ether
diethylene glycol monobenzyl ether
diethylene glycol monobutyl ether
di-propylene glycol
propylene glycol
triethylene glycol.

Any concentration of alkali from 0.04 N up to saturated yields the same product with respect to weight yield and analysis of the product provided that there is enough total alkali present to permit it. It is not necessary for all of this alkali to be in solution initially. Excesses of sodium hydroxide, other than that required for the starch lipids and proteins, are not required.

The temperature requirement for the reaction is fairly sharp at 81° C. except when alcoholates are used as a source of alkali. In this latter case the temperature requirements are not so critical. This is shown in Figure II, where the curve drawn in full indicates the temperature-reaction relationship for starch with sodium hydroxide, whereas the dotted lines illustrate that for sodium methylate with corn starch in methanol to produce mono sodium starchate.

Pressures up to 40 lbs. per square inch have no effect upon the reaction with respect to the weight yield and analysis of the product.

The time required for the reaction to be completed is about 2 hours at 79–80° C., but at 81° C. the reaction is practically instantaneous.

Water is evolved in this reaction, and its amount is stoichiometrically equivalent to the amount of the sodium hydroxide entering the starch molecule (Figure III).

Karrer, Pringsheim, Pfeiffer and Tollens all observed that polysaccharides such as starch, cellulose and xylan adsorbed hydroxide from aqueous solutions to produce compounds of the type $C_{12}H_{20}O_{10}.NaOH$. Purification of these compounds gave a series of amylates, such as $(C_{12}H_{20}O_{10})_2.NaOH$, $(C_{12}H_{20}O_{10})_3.NaOH$, etc.

However, with starch in a non-aqueous solvent, such as alcohol, the reaction proceeds as follows:

a. Addition

$C_6H_{10}O_5 + NaOH \longrightarrow C_6H_{10}O_5.NaOH$ b. Dehydration

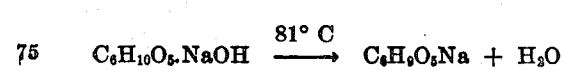
$C_6H_{10}O_5.NaOH \xrightarrow{81°C} C_6H_9O_5Na + H_2O$

Alcoholates of this type ($C_6H_9O_5Na$) undergo double decomposition as, for instance, in the case of $CuCl_2$:

$$C_6H_9O_5Na + CuCl_2 \rightarrow C_6H_9O_5CuCl + NaCl$$

Similar reactions introduced about 30 metals into this type of structure. Usually only one valence of the multivalent metals reacted.

The metallic derivatives usually have exceptional stability, for example, when reacted with sodium hydroxide, the copper remains in the molecule and the following reaction takes place:

$$C_6H_9O_5CuCl + NaOH \rightarrow C_6H_9O_5CuOH + NaCl$$

Similarly the Cl has been replaced by about 30 other anions such as $HCO_3^-$, $H_2PO_4^-$, $HSO_4^-$, $CN^-$, $NaSO_4^-$, etc.

Following are examples of the practice of my invention in the manufacture of various starchates.

EXAMPLE I 80 grams of NaOH are dissolved in a liter of ethyl alcohol and the alcohol insoluble portion consisting of mostly alkali carbonates is filtered out and the filtered alcoholic NaOH is mixed with dry starch in the proportion of about 1 liter of alcoholic NaOH to 100 grams of starch. The mixture is then refluxed at the boiling temperature of the alcoholic solution for a period of two to four hours with vigorous stirring so as to maintain the temperature uniform throughout the mixture and avoid decomposition of the starch before the reaction with the sodium hydroxide is completed.

Thereafter, the refluxed mixture is filtered by suitable means, such as with the use of vacuum, centrifugal, or pressure filters. The filtered product is then washed free of NaOH by alcohol. The quantity of alcohol used in the washing depends upon the efficiency of the washings. Ordinarily a liter of alcohol is used per 100 grams of filter cake (dry basis) and where the filter cake is thicker, this amount may be used to wash 450 to 500 grams of the product. The starchate compound formed is then washed with ether to remove the alcohol in which there may be used approximately 100 cc. per 450 grams of starchate. Alcohol present in cake tends to catalyze the transition of the metal from the starchate to alkali metal carbonate. Washing with ether eliminates this danger and vacuum drying also aids this.

The product is then dried at a temperature below 78° C., preferably vacuum drying being used. The final starchate product is then screened and packed in air-tight containers.

Whereas the foregoing example illustrates a process for making the starchate in small batches in the chemical laboratory, the following Example II is typical for manufacturing sodium starchate on a large scale for industrial purposes.

EXAMPLE II 417 pounds of flake caustic soda or caustic potash is dissolved in approximately 500 gallons of industrial ethyl alcohol. The mixture is allowed to stand to precipitate the carbonate impurities present which are removed by filtration.

Approximately 500 pounds of dry starch (i. e. potato starch) is introduced into the alcoholic NaOH solution and the whole mixture refluxed for two hours below 98° C. while being vigorously stirred. The product is then filtered and washed free of alkali with ethyl alcohol and the filter product consisting of sodium starchate is dried in a vacuum oven under 78° C. equipped with means for preventing entry of carbon dioxide and means for recovery of the alcohol.

The dry product is then ground, screened and packed in substantially airtight containers. This process gives a yield of about 94.4% to 99.9% in case of potato starches and 79% to 82% in case of rice starch, both yields being practically theoretical when based on β-amylose content.

EXAMPLE III 100 grams starch
20 grams sodium hydroxide
500 cc. butanol were mixed and heated with agitation to a temperature of approximately 85° C. for a period of time of from 30 to 60 minutes. The reaction product formed was then filtered off by suction, washed with butanol and thereafter with ether, and then air-dried for a short period of time. The product is then ready for being filled into storage containers such as bottles. The sodium starchate obtained is readily soluble in water, and the solution has an essentially lower viscosity than has a simple solution of starch in NaOH.

While in Examples I and II ethyl alcohol is used as the non-aqueous solvent, butanol is employed in Example III. The reaction proceeds somewhat differently in the two cases which is obviously due to the different boiling points of the two alcohols. Ethanol boiling slightly below the reaction temperature of 81° C. necessitates the addition of excessive NaOH in order to raise the boiling temperature and also to bring the reaction to completion as fully as possible by mass action. This is different when butanol is employed; then no excess of sodium hydroxide is necessary since the boiling point is sufficiently high. In the cases where ethanol is used, the excess of sodium hydroxide must finally be removed by filtration and washing; with butanol as the solvent, these steps are not necessary.

In Example III, the 100 g. of commercial starch correspond to approximately 87 g. of pure starch. It is of advantage, though, in the case of butanol, rather to use a slight excess of starch so as to avoid non-reacted sodium hydroxide in the final product which would necessitate filtration and washing.

In order to show that the sodium starchate compound which I have discovered is an alcoholate distinguishable from NaOH-starch addition products of the prior art, X-ray studies were made of different starch substances, as illustrated in Figures 4 to 9.

Figure 4 is a reproduction of an X-ray photograph of the raw rice starch as used in my process. Figure 5 is a similar X-ray photograph showing the results after extracting raw starch with alcohol. Figure 6 is a similar photograph after the extraction by alcohol has been made the second time. Figure 7 is a photograph of the original starch after being washed with 1% alcoholic NaOH solution. Figure 8 is an X-ray photograph of the starch after it has been refluxed with 5% alcoholic NaOH solution. Figure 9 is an X-ray photograph of the sodium starchate made according to this invention containing 16% NaOH.

Figure 10 is a drawing illustrating the concentric ring structure which appears when a raw particle of starch is X-ray photographed.

Figure 11 is a similar drawing showing the new ring structure which appears when the same starch is reacted with a predetermined amount of sodium hydroxide to produce sodium starchate in accordance with my discovery. Figures 10 and 11 correspond to Figures 4 and 9, respectively.

Figure 1:
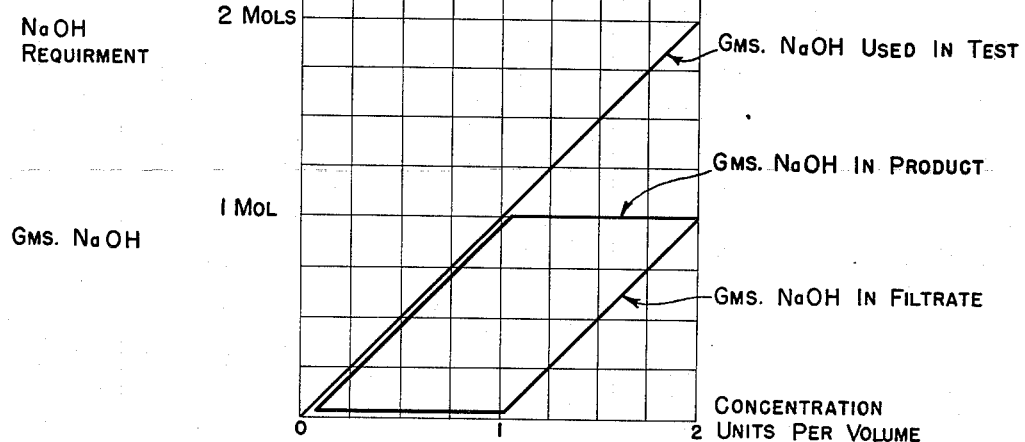
Figure 2:
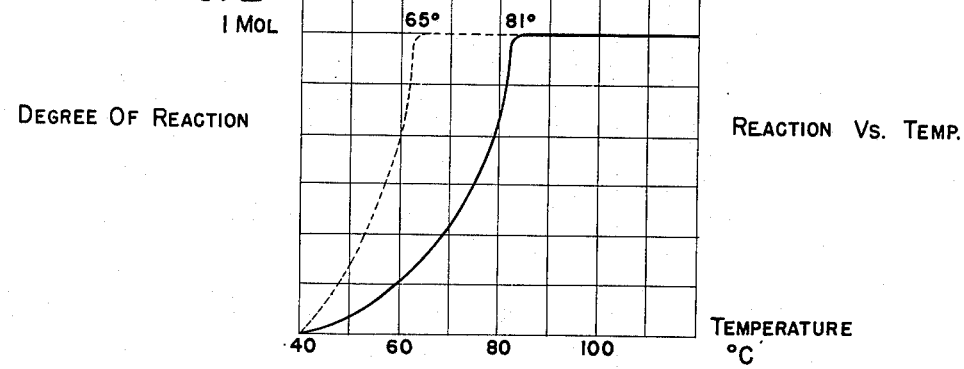
Figure 3:
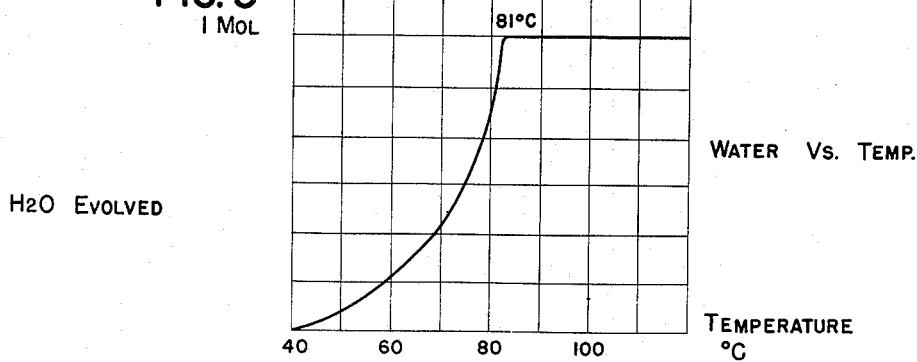

As will be noted, the alcoholic extraction and washing with 1% alcoholic NaOH have no effect on the starch since those structures being responsible for the rings having the diameters 0.95, 1.65, 1.90, 2.22, 2.25, 3.03 and 3.50 cms. have not been altered. In the case of starch which was refluxed with 5% alcoholic NaOH, the lines having the diameters 0.95 and 2.22 have disappeared indicating that the protein may have been removed. No compound is indicated since no new lines appeared.

In Figure 9 and as illustrated by the corresponding Figure 11, however, where the starchate contains 16% NaOH, it will be observed that certain lines have been expanded, namely 1.65 to 1.70, 2.55 to 2.58 and 3.03 to 3.17, indicating that the structure has been expanded in one dimension and also new lines appear as at 4.30, 4.80, 5.09, 5.40, 6.50 and 6.95. This X-ray photograph substantiates that my new sodium starch product is a compound.

Diverse kinds of substances are usable as the raw material for the process of this invention. Thus dextrans, dextrins, cotton, linen, ramie, jute, cellulose and many others yield the same result as does starch.

If a metal starchate other than alkali metal starchate is to be prepared, an alkali metal starchate may be produced as an intermediate product according to Example I and then filtered and washed and afterwards converted into a metal starchate as illustrated below in Example IV. On the other hand, the alkali metal starchate may be produced by a process analogous to that of Example III. In such case, the alkali metal starchate does not have to be separated by filtering but may be converted into the metal starchate in situ as illustrated in Example V.

EXAMPLE IV

The metal salt is dissolved in ethyl alcohol or a similar non-aqueous solvent and the solution then added to the stoichiometric quantity of filtered and washed sodium starchate of Example I. The mixture is warmed and vigorously stirred until the reaction is completed. Thereafter the product is filtered, washed with ethyl alcohol and finally with ether, then dried and screened.

The following example illustrates the preparation of copper chloro starchate.

EXAMPLE V

The solution obtained in Example III after refluxing, 65 grams anhydrous cupric chloride
500 cc. butanol.

The mixture was heated, while vigorously agitated, to a temperature of substantially 85° C. for about 2 hours. The copper chloro starchate formed was filtered off by suction, washed with butanol and then with ether and air-dried.

The silver starchate may be made in the following manner:

EXAMPLE VI 500 grams corn starch
100 grams sodium hydroxide
3000 cc. butanol were heated to 90° C. for approximately 1½ hours, and then a solution containing the following ingredients was added:

425 grams silver nitrate
200 cc. water
2000 cc. butanol.

The mixture was then heated to a temperature of between 80° and 90° C. for 2 hours. The product obtained was filtered off, washed first with butanol and then with ether and air-dried. The yield of the dry raw product was 1025 grams. This raw product was then subjected to a purifying process in order mainly to wash out the sodium nitrate formed, which was carried out by washing with dilute alcohol. The purified product was then dried and powdered. The final yield was 767 grams and its silver content was determined to be 35.5%. The product was of black color and pseudo-crystalline. This new silver salt might become of great value in the pharmaceutical and medical fields.

Other starchates of monovalent metals, such as mercurous starchate, cuprous starchate, gold starchate, and thallium starchate, etc. may be manufactured in the analogous way as is described in Example VI.

The starchates of the alkali metals are best prepared directly in the same manner as was described in detail in connection with the preparation of sodium starchate.

Various salts when reacted with my sodium starchate as described give complex reaction products as described for copper chloride in Example V. Others are listed in the following examples:

(a) Cobalt chloride in alcohol reacted with sodium starchate as outlined above gives cobalt chloro starch. When the product is oven dried at from 70 to 75° C. it is blue in color, whereas, if air-dried, it is pink.

(b) Cobalt chloride is dissolved in ammonium hydroxide and reacted with sodium starchate and precipitated with alcohol. When air-dried cobalt amino hydroxy starch is formed. Oven drying forms cobalt hydroxy starch.

(c) Nickel chloride in alcohol reacted with sodium starchate likewise forms nickel chloro starch. Some of this material in alcohol when treated with ammonium hydroxide, filtered and air-dried produced nickel amino hydroxy starch. When oven dried nickel hydroxy starch is formed.

(d) Zinc chloride in alcohol reacted with sodium starchate forms zinc chloro starch.

(e) Copper chloride in alcohol was reacted with sodium starchate and produced copper chloro starch as the reaction product. Further treatment of copper chloro starch in alcohol with ammonium hydroxide formed copper amino chloro starch.

(f) An alcoholic solution of basic lead acetate when reacted with sodium starchate formed lead hydroxy starch.

(g) A solution of uranium nitrate in alcohol was decolorized completely with sodium starchate formed from potato starch to form uranium nitrate starch.

(h) Sodium starchate and ether solution of ferric chloride when reacted produced ferric chloro starch.

(i) Sodium starchate and ether solution of aluminum chloride reacted to form aluminum chloro starch.

(j) Sodium starchate and alcoholic solution of calcium chloride react producing calcium chloro starch.

(k) Sodium starchate and alcoholic solution of magnesium chloride react forming magnesium chloro starch.

(l) Sodium starchate and alcoholic solution of barium bromide reacted produce barium bromo starch.

A great number of other metallic starchate compounds can be produced by reacting an alkali metal or equivalent starchate compound with a salt of the metal of which a starch derivative is desired, as described in Example IV. When my sodium starchate product is chemically reacted with the following compounds there are formed, by double decomposition, other starch derivative products as follows:

Aluminum:
    Chloride forms alumino chloro starch
    Bromide forms alumino bromo starch
    Iodide forms alumino iodo starch
    Nitrate forms alumino nitrate starch Barium:
    Bromide forms barium bromo starch
    Perchlorate forms barium perchlorate starch
    Thiocyanate forms barium thiocyanate starch Beryllium:
    Bromide forms beryllium bromo starch
    Chloride forms beryllium chloro starch
    Fluoride forms beryllium fluoro starch
    Iodide forms beryllium iodo starch Bismuth:
    Chloride forms bismuth chloro starch Boron:
    Bromide forms boron bromo starch Cadmium:
    Bromide forms cadmium bromo starch
    Iodide forms cadmium iodo starch
    Nitrate forms cadmium nitrate starch
    Sulfate forms cadmium sodium sulfate starch Calcium:
    Bromide forms calcium bromo starch
    Chloride forms calcium chloro starch
    Chlorate forms calcium chlorate starch
    Perchlorate forms calcium perchlorate starch
    Chromate forms calcium chromate starch
    Iodide forms calcium iodo starch
    Nitrate forms calcium nitrate starch
    Thiocyanate forms calcium thiocyanate starch Cerium:
    Iodide forms cerium iodo starch
    Bromide forms cerium bromo starch
    Nitrate forms cerium nitrate starch Chromium:
    Bromide forms chromium bromo starch
    Chloride forms chromium chloro starch
    Fuoride forms chromium fluoro starch
    Nitrate forms chromium nitrate starch
    Sulfate forms chromium sodium sulfate starch Cobalt:
    Chloride forms cobalt chloro starch
    Bromide forms cobalt bromo starch
    Chlorate forms cobalt chlorate starch
    Perchlorate forms cobalt perchlorate starch
    Iodide forms cobalt iodo starch
    Nitrate forms cobalt nitrate starch
    Sulfate forms cobalt sodium sulfate starch
    Sulfide forms cobalt sulfo starch Columbium:
    Chloride forms columbium chloro starch
    Fluoride forms columbium fluoro starch Copper:
    Bromide forms copper bromo starch
    Chloride forms copper chloro starch
    Fluoride forms copper fluoro starch
    Nitrate forms copper nitrate starch Dysprosium:
    Chloride forms dysprosium chloro starch
    Bromide forms dysprosium bromo starch
    Iodide forms dysprosium iodo starch
    Bromate forms dysprosium bromate starch Erbium:
    Chloride forms erbium chloro starch
    Nitrate forms erbium nitrate starch Gallium:
    Sulfate forms gallium sodium sulfate starch Germanium:
    Bromide forms germanium bromo starch
    Chloride forms germanium chloro starch Gold:
    Bromide forms gold bromo starch
    Chloride forms gold chloro starch
    Cyanide forms gold cyano starch Indium:
    Perchlorate forms indium perchlorate starch
    Nitrate forms indium nitrate starch Iridium:
    Bromide forms iridium bromo starch Iron:
    Bromide forms iron bromo starch
    Perchlorate forms iron perchlorate starch
    Chloride forms iron chloro starch
    Iodide forms iron iodo starch
    Nitrate forms iron nitrate starch
    Sulfate forms iron sodium sulfate starch
    Thiocyanate forms iron thiocyanate starch Lanthanum:
    Bromide forms lanthanum bromo starch
    Chloride forms lanthanum chloro starch
    Nitrate forms lanthanum nitrate starch Lead:
    Chlorate forms lead chlorate starch Magnesium:
    Bromide forms magnesium bromo starch
    Chlorate forms magnesium chlorate starch
    Chloride forms magnesium chloro starch
    Iodide forms magnesium iodo starch
    Nitrate forms magnesium nitrate starch
    Sulfate forms magnesium sodium sulfate starch
    Thiosulfate forms magnesium thiosulfate starch Manganese:
    Chloride forms manganese chloro starch
    Nitrate forms manganese nitrate starch
    Sulfate forms manganese sulfate starch
    Sulfide forms manganese sulfo starch
    Thiocyanate forms manganese thiocyanate starch Mercury:
    Ammonium iodide forms a mercury starch compound
    Potassium cyanide forms a mercury starch compound Molybdenum:
    Chloride forms molybdenum chloro starch Neodymium:
    Chloride forms neodymium chloro starch Nickel:
    Bromide forms nickel bromo starch
    Chloride forms nickel chloro starch
    Perchlorate forms nickel perchlorate starch
    Iodide forms nickel iodo starch
    Nitrate forms nickel nitrate starch
    Sulfate forms nickel sulfate starch Osmium:
    Chloride forms osmium chloro starch
Platinum:
    Bromide forms platinum bromo starch
    Chloride forms platinum chloro starch
    Sulfate forms platinum sodium sulfate starch
Praseodymium:
    Chloride forms praseodymium chloro starch
Radium:
    Bromide forms radium bromo starch
    Chloride forms radium chloro starch
Rhodium:
    Chloride forms rhodium chloro starch
Ruthenium:
    Chloride forms ruthenium chloro starch
Samarium:
    Chloride forms samarium chloro starch
Silver:
    Perchlorate forms silver starch
Strontium:
    Bromide forms strontium bromo starch
    Chlorate forms strontium chlorate starch
    Chloride forms strontium chloro starch
    Sulfide forms strontium sulfo starch
Tantalum:
    Bromide forms tantalum bromo starch
    Chloride forms tantalum chloro starch
Terbium:
    Chloride forms terbium chloro starch
Thallium:
    Bromide forms thallium bromo starch
    Chloride forms thallium chloro starch
    Iodide forms thallium iodo starch
Thorium:
    Chloride forms thorium chloro starch
    Nitrate forms thorium nitrate starch
Tin:
    Chloride forms tin chloro starch
    Iodide forms tin iodo starch
Titanium:
    Bromide forms titanium bromo starch
    Chloride forms titanium chloro starch
Tungsten:
    Bromide forms tungsten bromo starch
    Chloride forms tungsten chloro starch
Uranium:
    Chloride forms uranium chloro starch
    Nitrate forms uranium nitrate starch
Uranyl:
    Chloride forms uranyl chloro starch
    Nitrate forms uranyl nitrate starch
Vanadium:
    Bromide forms vanadium bromo starch
    Chloride forms vanadium chloro starch
    Fluoride forms vanadium fluoro starch
Vanadyl:
    Sulfate forms vanadyl sodium sulfate starch
Yttrium:
    Bromide forms yttrium bromo starch
    Chloride forms yttrium chloro starch
    Iodide forms yttrium iodo starch
    Nitrate forms yttrium nitrate starch
Zinc:
    Bromide forms zinc bromo starch
    Chloride forms zinc chloro starch
    Iodide forms zinc iodo starch
    Nitrate forms zinc nitrate starch
    Thiocyanate forms zinc thiocyanate starch
Zirconium:
    Chloride forms zirconium chloro starch
    Bromide forms zirconium bromo starch
Zirconyl:
    Chloride forms zirconyl chloro starch
    Iodide forms zirconyl iodo starch In view of the above reaction products which are formed when my sodium starchate compound is treated, it is obvious that many other possible combinations may occur. For example, the metals of the copper-silver group all co-ordinate ammonia to form the Werner complexes. Ferrous or ferric cyanide starchates may be formed.

Instead of metallic elements, non-metallic elements may be introduced into the starch molecule to form starchates; this is performed in the same manner as described in connection with the preparation of metal starchates. In the following, a few examples of starchates of non-metallic elements are listed.

Sulfur:
    Sulfur monochloride in high boiling petroleum ether was reacted with sodium starchate to form dithiochloro starch.
    Sodium starchate and petroleum ether solution of thionyl chloride reacted to form sulfur oxychloro starch
Arsenic:
    Sodium starchate and petrodeum ether solution of arsenic trichloride reacted producing arsenic chloro starch.
    Arsenic fluoride forms arsenic fluoro starch.
    Arsenic iodide forms arsenic iodo starch.
    Arsenic sulfide forms arsenic thio starch.
Antimony:
    Sodium starchate and petroleum ether solution of antimony trichloride react producing antimony chloro starch.
    Antimony iodide forms antimony iodo starch.
Phosphorus:
    Sodium starchate and petroleum ether solution of phosphorus oxychloride reacted to produce phosphorous oxychlorostarch.
    Phosphorus fluoride yields phosphorus fluoro starch.
    Phosphorus sulfide yields phosphorus sulfo starch.
    Phosphorus thiocyanate yields phosphorus thiocyanate starch.
Selenium:
    Selenium oxyfluoride forms selenium oxyfluoro starch.
Silicon:
    Silicon fluoride forms silico fluoro starch.
Tellurium:
    Tellurium chloride forms tellurium chloro starch.

According to the present invention, alkali metal starchates, prepared by the method described above, may also be reacted with organic alkylating agents, such as sulfates, nitrites, nitro paraffins, phosphates, acetates, benzoates, halides, etc., whereby mono-alkyl substitution products are formed. The reaction taking place is the so-called Williamson ether reaction. This reaction, in the case of sodium starchate and methyl iodide, for example, proceeds according to the following equation:

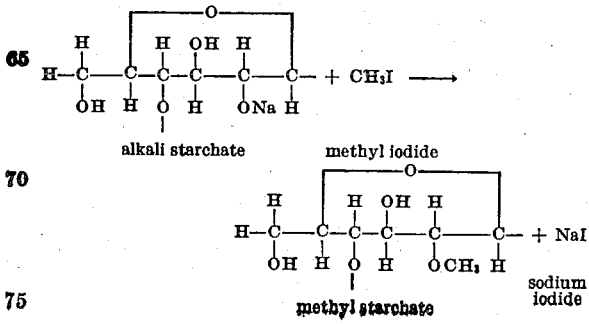

Usually this reaction proceeds to about 60% theory in one operation, to 85% in two operations, to 97% in three operations and 97.5% in four operations in the case of rice starch. If the product containing 0.60 of one methoxyl group per glucose unit is again subjected to the alkali treatment, it was found that it will pick up 0.40 of one sodium hydroxide. Similarly, the product containing 0.85 part of the stoichiometric methoxyl content will pick up the remaining 0.15 part of sodium hydroxide, etc.

In order to find out about the position of the starch molecule where the reaction takes place, the glucosidic hydrolysis technique was applied. This technique yielded:

a. Alpha-methyl glucoside equivalent in quantity to the glucose units in the original starch which were not methylated.

b. A methylated methyl glucoside which was not further identified, and which constituted the major reaction product.

c. No other product could be detected.

Acid hydrolysis of the monomethyl starch yielded a sirup which was then treated with phenylhydrazine in hopes that we could effect an efficient separation of the phenylhydrazine derivatives. This technique yielded:

a. The product obtained in predominant quantities was 2-methyl-D-glucose phenylhydrazone with M. P. 178° and $(\alpha)_D = -12.3$ in pyridine, which are the constants given in the literature.

b. A much smaller portion was a yellow product and identified as an osazone-derivative.

c. No glucosazone could be detected even though it was positive (on the basis of the alpha-methyl glucoside isolated) some should have been isolated.

The crystalline 2-methyl glucose phenylhydrazone and the crystalline osazone-type compound isolated accounted for 80% of the 70 grams used of monomethyl starch. The glucosazone that should have been formed would have accounted for 4%. On a hunch that some sort of a double crystal was formed, pure glucosazone was prepared and mixed with 2-methyl-D-glucose phenylhydrazone; the mixture was then recrystallized. Yellow osazone-like crystals having the same constants as that obtained from the hydrolysate were obtained. The proportions of the glucosazone and of the 2-methyl-D-glucose phenylhydrazone were varied; the results of these tests indicated that the compound contained one mole of 2-methyl-D-glucose phenylhydrazone with one mole of glucosazone. The osazone-like crystals contained methoxyl groups.

I have isolated, in pure crystalline form, nearly 90% of the calculated quantity of 2-methyl-D-glucose phenylhydrazone obtainable (or slightly over 80% of the amount theoretically possible). This indicates that actually one mole of starch reacts with practically one mole (it is slightly less) of the reactant. No other methylated derivative was detected and the mother liquors were not exhaustively depleted of the hydrazone. Further some of the methylated starch was lost during the hydrolysis and subsequent removal of the incompletely hydrolyzed polyamyloses. Considering all factors, especially these losses, the limit of the reaction, and the very high recovery of the hydrazone, it is believed that it has been conclusively proved that the reaction occurs only on $C_2$ and that over 80% of the reaction does occur on $C_2$.

If such a mono ether having an ether group on the $C_2$ carbon is subjected to the action of various amylolytic enzymes as described in the prior art literature, only liquification occurs. The reducing value of the digest does not increase above that which would be expected from the unreacted glucose units. Thus, it appears that no hydrolysis of the mono ethers occurs. Therefore, there has been produced a depolymerized non-reducing soluble starch-like product which (the number 2 position being occupied) resists enzymatic hydrolysis. Such enzymatic digests may be dehydrated according to the art to produce soluble starch-like products which are readily dispersible in cold water. These products are all very hygroscopic and very adhesive.

The metal starchates described undergo the Williamson ether reaction to form organic derivative products. The following examples (Example VII) are typical and illustrative.

EXAMPLE VII (a) Ethyl starch

Sodium starchate and ethyl bromide mixed in proportionate stoichiometric weight amounts calculated to form ethyl starch when reacted, were refluxed for 12 hours, filtered, dissolved in water, coagulated with ethyl alcohol and again filtered. The coagulum formed crystalline particles when heated with butyl alcohol and analyzed as ethyl starch.

Sodium starchate was refluxed in ethyl acetate for 3 hours, filtered and purified as above to produce ethyl starch.

(b) Benzyl starch

Sodium starchate was refluxed for 6 hours with benzy chloride in petroleum ether (B. P. 65–110° C.), filtered, and purified as above to produce benzyl starch.

Sodium starchate was heated at 100° C. with benzyl acetate for 3 hours, filtered, and purified as above forming benzyl starch.

(c) Isoamyl starch

Sodium starchate was refluxed for 3 hours with isoamyl bromide, filtered and purified as above producing isoamyl starch.

(d) Butyl starch

Sodium starchate was refluxed for 6 hours with butyl chloride, filtered and purified as above to produce butyl starch.

(e) Hydroxy ethyl starch

Sodium starchate was refluxed for about 10 minutes at 100° C. with chlorhydrin in pyridine and purified twice as above forming hydroxy ethyl starch.

(f) o-Chloro benzyl starch

Sodium starchate treated with o-chloro benzyl chloride and reacted as in the above examples produced a product which upon purification and analysis contained 8% chlorine equivalent to 65% yield of ortho-chloro-benzyl-ether of starch. Prolonged heating above 100° C. yielded a product in which more chlorine was reacted with the sodium starchate which product was water insoluble and formed no colloidal solution upon heating as does starch and derivatives thereof such as ethyl starch.

The process described may be used for substituting all kinds of organic radicals, such as aryl, alkyl, and aralkyl radicals for the sodium, or other metal, in the starchate molecule. Thus, the following organic compositions have been used for synthesizing organic starchates:

acetodichlorohydrin
acetyl chloride
acetic anhydride
allyl bromide
allyl chloride
allyl iodide
n-amyl bromide
iso-amyl bromide
iso-amyl chloride
tert.-amyl chloride
amylene dichloride
iso-amyl iodide
benzalacetophenone dibromide
benzal chloride
benzotrichloride
benzyl bromide
benzyl chloride
bromoacetic acid
ω-bromoaceto-β-naphthone
α-bromo-n-butyric acid
2-bromo-1-chloropropane
bromocyclohexane
β-bromoethyl ether
β-bromoethyl phenyl ether
bromoform
2-bromo-n-octane
p-bromophenacyl bromide
bromopicrin
α-bromopropionic acid
β-bromopropionic acid
γ-bromopropyl phenyl ether
α-n-valeric acid
α-bromo-iso-valeric acid
n-butyl bromide
iso-butyl bromide
sec.-butyl bromide
tert.-butyl bromide
n-butyl chloride
iso-butyl chloride
sec.-butyl chloride
tert.-butyl chloride
n-butyl chloroacetate
iso-butyl chlorocarbonate
α-butylene bromide
β-butylene bromide
iso-butylene bromide
n-butylidene chloride
n-butyl iodide
iso-butyl iodide
sec. butyl iodide
tert.-butyl iodide
cetyl bromide
cetyl iodide
chloral
chloroacetamide
chloroacetdiethylamide
chloroacetic acid
chloroacetone
chloroacetonitrile
chlorobutane
β-chlorobutyric acid
γ-chlorobutyronitrile
chlorocyclohexane
β-chloroethyl acetate
β-chloromethyl chlorocarbonate
chloroform
chloropicrin
α-chloropropionic acid
β-chloropropionic acid
β-chloropropionitrile
γ-chloropropyl chlorocarbonate
decamethylene bromide
α,β-dibromobutyric acid
2,3-dibromopropene
α,β-dibromopropionic acid
β,γ-dibromopropyl alcohol
3,5-dibromopyridine
α,β-dibromosuccinic acid
dichloroacetic acid
γ,γ'-dichloropropyl ether
β,β'-dichloroisopropyl ether
epibromohydrin
epichlorohydrin
ethyl bromide
ethyl bromoacetate
ethyl α-bromo-n-butyrate
ethyl α-bromo-n-caproate
ethyl bromomalonate
ethyl α-bromopropionate
ethyl β-bromopropionate
ethyl α-bromisovalerate
ethyl chloride
ethyl chloroacetate
ethyl α-chloroacetoacetate
ethyl chlorocarbonate
ethyl β-chloropropionate
ethyl dibromoacetate
ethyl dibromomalonate
ethyl dichloroacetate
ethylene bromide
ethylene bromohydrin
ethylene chloride
ethylene chlorobromide
ethylene chlorohydrin
ethylidene bromide
ethylidene chloride
ethyl iodide
ethyl trichloroacetate
glycerol α,γ-dibromohydrin
glycerol α,γ-dichlorohydrin
glycerol α,β-dichlorohydrin
glycerol α-monochlorohydrin
n-heptyl bromide
n-heptyl iodide
hexachloroethane
hexamethylene bromide
n-hexyl bromide
n-hexyl chlorocarbonate
n-hexyl iodide
iodoacetic acid
iodoform
lauryl bromide
lauryl chloride
methyl bromide
methyl bromoacetate
methyl β-bromopropionate
methyl chloroacetate
methyl chlorocarbonate
methyl chloroform
methyl α,β-dibromopropionate
methyl α,β-dichloropropionate
methylene bromide
methylene chloride
methylene iodide
methyl iodide
myristyl bromide
n-nonyl bromide
n-octadecyl bromide
n-octadecyl chloride
phenacyl bromide
phenacyl chloride
phthalimide chloride
n-propyl bromide
isopropyl bromide n-propyl chloride
isopropyl chloride
propylene bromide
propylene bromohydrin
propylene chloride
propylene chlorobromide
propylene chlorohydrin
s-tetrabromoethane
s-tetrachloroethane
tetrachloroethylene
1,1,2-tribromoethane
tribromoethylene
1,2,3-tribromo-2-methyl propane
1,2,3-tribromopropane
trichloroacetic acid
trichloro-tert.-butyl alcohol
2,2,3-trichlorobutyric acid
1,1,2-trichloroethane
trichloroethylene
1,2,3-trichloropropane
triglycol dichloride
trimethylene bromide
trimethylene bromohydrin
trimethylene chloride
trimethylene chlorobromide
trimethylene chlorohydrin
triphenylchloromethane
o-xylyl bromide
m-xylyl bromide
p-xylyl bromide
o-xylylene bromide
o-xylylene chloride and similarly reacting chemicals especially the esters.

In carrying out the process for the preparation of an organic starchate, the sodium starchate and the organic halide are mixed together, preferably with a non-aqueous suspending medium, and the mixture is then heated to a temperature of from 80 to 115° C. The heating is advantageously carried out in an autoclave, and the pressure is raised to approximately 40 to 42 pounds. The higher the temperature, the faster the reaction takes place. At about 80° C. the reaction is completed after two hours, whereas at 115° C. the reaction takes place almost immediately.

The following non-aqueous liquid vehicles were found usable as suspending media, among many others, for preparing metal starchates as well as organic starchates.

Hydrocarbons sec.-amyl benzene
tert.-amyl benzene
n-butyl benzene
benzene
sec.-butyl benzene
tert.-butyl benzene
cumene
cyclohexane
2,7-dimethyl octane
ethyl cyclohexane
heptane
hexane
hexadecane
ligroin
methyl cyclohexane
nonane
n-octane
iso-octane
n-pentane
petroleum ether
propyl benzene
tetraisobutylene
tetradecane
toluene
triisobutylene
trimethyl butane
trimethylethylene
2,2,4-trimethyl pentane
triphenyl methane
o-xylene
m-xylene
p-xylene
and various others.

Alcohols

The alcohols listed above (columns 3 and 4) as satisfactory solvents for sodium hydroxide were likewise found suitable as suspending media in the preparation of metal starchates.

Ketones acetone
acetophenone
anisalacetone
benzalacetone
benzophenone
benzoylacetone
diethyl
diisopropyl
ethyl phenyl
ethyl undecyl
methyl amyl
methyl butyl
o-methyl cyclohexanone
m-methyl cyclohexanone
p-methyl cyclohexanone
methyl ethyl
methyl hexyl
methyl n-propyl
methyl iso-propyl
and various others.

Ethers allyl
allyl ethyl
n-amyl
iso-amyl
anethole
anisole
benzyl
benzylmethyl
n-butyl benzyl
n-butyl
n-butylphenyl
1,4-dioxane
di-n-propyl
benzyl ethyl
chloromethyl
dichloromethyl
diethylene glycol diethyl
ethyl butyl
ethylene glycol dibenzyl
ethylene glycol diethyl
ethyl
phenetole
n-hexyl
n-propyl
iso-propyl
and various others.

Heretofore various methods have been used for preparing organic starchates. In all of these previous methods, the degree of substitution changed or varied with the conditions of the reaction. Thus the degree of substitution varied with the time allowed for the reaction, temperature, concentration and ratio of reactants, agitation of the solution, etc. Thus, in many cases, all three of the hydroxyl groups available were replaced by organic radicals. In some cases the product would analyze to be a mono-substitution product or less than a tri-substituted product although perhaps more or less than a mono-substitution product. In such cases some of the glucopyranose units would be fully substituted and have all three of the hydroxyl groups replaced by organic radicals. Others would be partially substituted and have one or two of the hydroxyl groups replaced by organic radicals. Where the units were partially substituted, the organic radicals would be substituted at random, and it was impossible to forecast on which of the carbon positions the substituted organic radicals would be placed. Others of the units would have none of the hydroxyl groups substituted. In contradistinction to these reactions and against all expectations, it was found that by preparing a sodium starchate by my method and then using the Williamson ether reaction for the preparation of organic starchates, a mono-substitution product with the radical in the 2-position of the starch molecule is always obtained. This result is obtained regardless of concentration, duration of treatment, or of any other factor. A great number of various compositions, as already mentioned, were prepared by this method. Representatives of mono methyl and mono ethyl ethers were analyzed as to their molecular structure, and in each case it was proved that a 2-mono substitution product had been obtained. By analogy and by all known chemical laws each of the above listed compounds must react to produce the 2-mono ethers.

In the following, a few further examples are given demonstrating the details of the process of my invention.

EXAMPLE VIII 100 grams of starch were converted into sodium starchate by the process described in Example I. After the starchate was thoroughly washed with ethyl alcohol, the filter cake was suspended in 500 cc. of methyl acetate. The flask was then placed in an autoclave. In order to obtain satisfactory conduction of heat between the autoclave and the reaction flask, 200 cc. of methyl acetate were poured into the autoclave. The autoclave was then closed and heated to a pressure of from 40 to 42 pounds when the temperature had reached about 100° C. This temperature was maintained for approximately one hour. The product formed was then dissolved in water in order to remove the sodium acetate which is a by-product formed in the reaction. From this solution the methyl starch was precipitated with ethyl alcohol, filtered and dried. The product obtained was neutral, hydroscopic and very adhesive.

EXAMPLE IX

The same reagents were used as in Example VIII with the distinction that methyl alcohol was selected as the suspending agent. The reaction temperature used in this case was about 90° C., and it was maintained for two hours. The sodium iodide formed was dissolved in acetone and filtered off.

EXAMPLE X 100 grams of starch were converted into sodium starchate. After repeated washing of the starchate with ethyl alcohol, it was suspended in 500 cc. of 95% ethyl alcohol, and 100 grams of methyl iodide were then added. The flask was placed in an autoclave in which 300 cc. of ethyl alcohol were contained for the purpose of increasing the heat conduction. The reaction was carried out by heating to 100° C. for about two hours. The product obtained was again purified by treating with acetone.

EXAMPLE XI

Sodium starchate corresponding to one part by weight of starch was reacted with 7.5 parts of methyl iodide.

Petroleum ether was used as the heat conducting medium. Heating was carried out at about 85° C. for two hours. The methyl starch formed was treated as in the previous example.

Whereas in Examples VIII to X the yield ranged from 25.87% to 52.37%, respectively, the yield in this example was between 82 and 84%. This is probably due to the fact that the sodium in the starchate formed an equilibrium with the alcohols used in Examples VIII to X.

Another medium yielding a high output is benzene. This is demonstrated by

EXAMPLE XII 150 grams of rice starch was suspended in 750 cc. of ethyl alcohol, and 90 grams of sodium hydroxide were then added. The mixture was refluxed under vigorous stirring for two hours at a temperature of about 80° C. At the end of this period of time the reaction product was filtered off, washed ten times with ethyl alcohol, thereafter five times with ethyl ether and finally ten times with benzene. The product obtained was analyzed as to its alkali metal content; a total alkali content of 15.84% was ascertained.

190 grams of the sodium starchate thus obtained were suspended in 750 cc. of benzene and the mixture distilled under vigorous stirring. The distillation was continued, under repeated replacement of the benzene distilled off, until the temperature rose from 64° C. to 78° C. This mixture was then cooled to 30° C. and treated with 250 grams of methyl iodide in an autoclave using petroleum ether as heat conducting medium. During the heating, the temperature in the autoclave rose to approximately 80° C. and the pressure to 42 pounds, but thereafter they increased rapidly to 87° C. and 52 pounds, respectively; these conditions remained constant for approximately 15 minutes. After this, the temperature and pressure began to drop. The autoclave was then held at 82° C. with a pressure of 42 pounds for one hour.

The benzene-methyl iodide mixture was then decanted and the methylated starch analyzed after having been washed with acetone and dried at 130° C. The analysis showed a methoxy content of 9.5%, the theoretical value of the mono methyl starchate being 15.85%. This is a yield of 59.94% of mono methyl starchate as compared with the calculated theoretical value of 100%. As set forth above, the output could be increased by repeating the methylating step.

These experiments show, though, that no matter how often one subjects the methylated starchate to further methylating treatments, the mono methyl product is the limit obtainable. The final products of the various steps were analyzed in order to find out whether they were not a mixture of various methylated starches having from 0 to 3 methyl groups therein. These tests, however, proved clearly that no such mixture is present in the products obtained, and that the final product is definitely a mono methyl starchate which has the methyl group in the 2-position.

EXAMPLE XIII 10 grams of starch were converted into sodium starchate. The purified product was suspended in 50 grams of ethyl bromide and the suspension placed in a bomb; the bomb was then closed and heated in a water bath for two hours. The product obtained was extracted with petroleum ether in order to free it from excessive ethyl bromide. The starchate was first air dried and then dried at approximately 105° C. for twenty-four hours. The final product showed an ethoxy content of 11.44% which indicates a yield of 87.86%. A second ethylation step increased the ethoxy content to 12.58% which is a yield of 96.39% as expressed in percent of mono-ethyl starchate.

As was pointed out before, all kinds of organic radicals may be introduced into the starch molecule by the process of my invention. The halides are the most suitable compositions for the reaction. However, other compounds, such as acetates, for example, were also found usable.

Since the sodium starchate, which is used as the initial product for producing the organic starchates, is not soluble in the organic halides or other alkylating agents, it is preferred, though not necessary, that the starchate be dispersed in a dispersing agent or a solvent.

Stirring during the reaction is also advisable. It was found that the ratio of the reactants is of no import to the yield as long as there is sufficient alkylating agent for the production of the mono substitution product. The same is true with regard to the concentration which also does not have any effect on the course of the reaction.

While the production of metallic and organic starchates has been mainly described in connection with sodium starchate as the initial material, it will be understood that other metal starchates may be used with equal satisfaction.

The 2-mono starchate ethers of my invention may be used for the most manifold purposes. They are applicable as adhesives, wetting agents, detergents for the preparation of plastics, for coatings, sizings, stabilizers, emulsifying agents, in the cosmetics industry, for food products, for pharmaceuticals, in the paint industry, and the like. Many other new uses may be developed in the future.

It will be understood that while there have been described herein certain specific embodiments of the invention, it is not intended thereby to have the invention limited to or circumscribed by the specific details given in view of the fact that my invention is susceptible to various modifications and changes which come within the spirit of the disclosure and the scope of the appended claims.

I claim:

1. A method of making uniformly 2 substituted glucopyranose polymers comprising reacting glucopyranose polymers with alkali metal hydroxide at a temperature in the range of approximately 78° C. to 98° C. in a non-aqueous alcoholic system in which the alcohol boils at a temperature above 78° C. at 760 mm. pressure, and reacting in a non-aqueous system the 2 mono alkali metal glucopyranose polymers so formed with salt dissociable at a temperature of approximately 78° C. to 115° C. in a non-aqueous system and selected from the group consisting of ethereal salts, non-metal salts and metal salts other than salts of alkali metals and of ammonia, at a temperature in the range of approximately 78° C. to 115° C. whereby the salt cations replace alkali metal cations.

2. A method of making uniformly 2 substituted glucopyranose polymers comprising reacting glucopyranose polymers with alkali metal hydroxide at a temperature in the range of approximately 78° C. to 98° C. in a non-aqueous alcoholic system in which the alcohol boils at a temperature above 78° C. at 760 mm. pressure.

3. A method of making uniformly 2 substituted glucopyranose polymers comprising reacting, at a temperature in the range of approximately 78° C. to 115° C. in a nonaqueous system, 2 mono alkali metal glucopyranose polymers with salt dissociable at a temperature in the range of approximately 78° C. to 115° C. in a non-aqueous system and selected from the group consisting of ethereal salts, non-metal salts and metal salts other than salts of alkali metals and of ammonia whereby the salt cations replace alkali metal cations.

4. A method of making uniformly 2 substituted glucopyranose polymers comprising reacting, at a temperature in the range of approximately 78° C. to 115° C. in a non-aqueous system, 2 mono alkali metal glucopyranose polymers with ethereal salts dissociable at a temperature in the range of approximately 78° C. to 115° C. in a non-aqueous system whereby ethereal salt cations replace alkali metal cations.

5. A method of making uniformly 2 substituted glucopyranose polymers comprising reacting, at a temperature in the range of approximately 78° C. to 115° C. in a non-aqueous system, 2 mono alkali metal glucopyranose polymers with non-metal salts dissociable at a temperature in the range of approximately 78° C. to 115° C. in a non-aqueous system whereby non-metal salt cations replace alkali metal cations.

6. The method of making uniformly 2 substituted glucopyranose polymers comprising reacting, at a temperature in the range of approximately 78° C. to 115° C. in a non-aqueous system, 2 mono alkali metal glucopyranose polymers with metal salts other than salts of alkali metals and of ammonia which are dissociable at a temperature in the range of approximately 78° C. to 115° C. in a non-aqueous system whereby metal salt cations replace alkali metal cations.

7. A method of making uniformly 2 substituted glucopyranose polymers comprising reacting at a temperature in the range of approximately 78° C. to 115° C. in a non-aqueous system, 2 mono alkali metal glucopyranose polymers with an ethereal salt having an alkyl group with a maximum of 4 carbons in the longest straight chain dissociatable at a temperature in the range of approximately 78° C. to 115° C. in a non-aqueous system whereby ethereal salt cations replace alkali metal cations.

8. A method of making uniformly 2 substituted glucopyranose polymers comprising reacting at a temperature in the range of approximately 78° C. to 115° C. in a non-aqueous system, 2 mono alkali metal glucopyranose polymers with an alkyl ester of an organic acid dissociatable at a temperature in the range of approximately 78° C. to 115° C. in a non-aqueous system whereby alkyl radicals replace alkali metal cations.

9. A method of making uniformly 2 substituted glucopyranose polymers comprising reacting at a temperature in the range of approximately 78° C. to 115° C. in a non-aqueous system, 2 mono alkali metal glucopyranose polymers with an alkyl ester of an inorganic acid dissociatable at a temperature in the range of approximately 78° C. to 115° C. in a non-aqueous system whereby alkyl radicals replace alkali metal cations.

10. A method of making uniformly 2 substituted glucopyranose polymers comprising reacting at a temperature in the range of approximately 78° C. to 115° C. in a non-aqueous system, 2 mono alkali metal glucopyranose polymers with a di-ester of an organic acid dissociatable at a temperature in the range of approximately 78° C. to 115° C. in a non-aqueous system whereby cations of the ester replace alkali metal cations.

11. A method of making uniformly 2 substituted glucopyranose polymers comprising reacting at a temperature in the range of approximately 78° C. to 115° C. in a non-aqueous system, 2 mono alkali metal glucopyranose polymers with a di-ester of a halogen acid having the halogen on adjacent carbon atoms dissociatable at a temperature in the range of approximately 78° C. to 115° C. in a non-aqueous system whereby cations of the ester replace alkali metal cations.

12. A method of making uniformly 2 substituted glucopyranose polymers comprising reacting at a temperature in the range of approximately 78° C. to 115° C. in a non-aqueous system, 2 mono alkali metal glucopyranose polymers with a mixed ester of a halogen acid and an organic acid dissociatable at a temperature in the range of approximately 78° C. to 115° C. in a non-aqueous system whereby cations of the ester replace alkali metal cations.

13. A method of making uniformly 2 substituted glucopyranose polymers comprising reacting glucopyranose polymers with alkali metal hydroxide at a temperature in the range of approximately 78° C. to 98° C. in a non-aqueous alcoholic system in which the alcohol boils at a temperature above 78° C. at 760 mm. pressure, the alkali metal hydroxide being present in a concentration in the range of approximately .04N to saturation.

14. A method of making uniformly 2 substituted glucopyranose polymers comprising reacting glucopyranose polymers with sodium hydroxide at a temperature in the range of approximately 78° C. to 98° C. in a non-aqueous alcoholic system in which the alcohol boils at a temperature above 78° C. at 760 mm. pressure, the sodium hydroxide being present in a concentration in the range of approximately .04N to saturation.

15. A method of making uniformly 2 substituted glucopyranose polymers comprising reacting glucopyranose polymers with potassium hydroxide at a temperature in the range of approximately 78° C. to 98° C. in a non-aqueous alcoholic system in which the alcohol boils at a temperature above 78° C. at 760 mm. pressure, the potassium hydroxide being present in a concentration in the range of approximately 0.4N to saturation.

16. A method of making uniformly 2 substituted glucopyranose polymers comprising reacting glucopyranose polymers with alkali metal hydroxide at a temperature in the range of approximately 78° C. to 98° C. in a non-aqueous ethanol system.

17. A method of making uniformly 2 substituted glucopyranose polymers comprising reacting glucopyranose polymers with alkali metal hydroxide at a temperature in the range of approximately 78° C. to 98° C. in a non-aqueous n-butanol system.

18. A method of making uniformly 2 substituted glucopyranose polymers comprising reacting glucopyranose polymers with alkali metal hydroxide at a temperature in the range of approximately 78° C. to 98° C. in a non-aqueous n-amyl alcohol system.

19. A method of making uniformly 2 substituted starchates comprising reacting starch with alkali metal hydroxide at a temperature in the range of approximately 78° C. to 98° C. in a non-aqueous alcoholic system in which the alcohol boils at a temperature above 78° C. at 760 mm. pressure.

20. A method of making uniformly 2 substituted dextrans comprising reacting dextrans with alkali metal hydroxide at a temperature in the range of approximately 78° C. to 98° C. in a non-aqueous alcoholic system in which the alcohol boils at a temperature above 78° C. at 760 mm. pressure.

21. A method of making uniformly 2 substituted dextrins comprising reacting dextrins with alkali metal hydroxide at a temperature in the range of approximately 78° C. to 98° C. in a non-aqueous alcoholic system in which the alcohol boils at a temperature above 78° C. at 760 mm. pressure.

22. A method of making uniformly 2 substituted glucopyranose polymers comprising reacting at a temperature in the range of approximately 78° C. to 115° C. in a non-aqueous system 2 mono alkali metal glucopyranose polymers with arsenic chloride in a non-aqueous system whereby arsenic replaces alkali metal cations.

23. The method of making uniformly 2 substituted glucopyranose polymers comprising reacting at a temperature in the range of approximately 78° C. to 115° C. in a non-aqueous system 2 mono alkali metal glucopyranose polymers with silver nitrate in a non-aqueous system whereby silver replaces alkali metal cations.

24. A method of making uniformly 2 substituted glucopyranose polymers comprising reacting glucopyranose polymers with alkali metal hydroxide at a temperature in the range of 78° C. to 98° C. in a non-aqueous butanol system, and reacting in said non-aqueous butanol system the 2-mono alkali metal glucopyranose polymers so formed with salt dissociatable at a temperature in the range of approximately 78° C. to 115° C. in said non-aqueous butanol system and selected from the group consisting of ethereal salts, non-metal salts, and metal salts other than salts of alkali metals and of ammonia at a temperature in the range of approximately 78° C. to 115° C. whereby salt cations replace alkali metal cations.

25. A method of making uniformly 2 substituted starchates comprising reacting starch with alkali metal hydroxide at a temperature in the range of approximately 78° C. to 98° C. in a non-aqueous alcoholic system in which the alcohol boils at a temperature above 78° C. at 760 mm. pressure, and reacting in a non-aqueous system the 2-mono alkali metal starchates so formed with salt dissociatable at a temperature in the range of approximately 78° C. to 115° C. in a non-aqueous system and selected from the group consisting of ethereal salts, non-metal salts and metal salts other than salts of alkali metals and of ammonia, at a temperature in the range of 78° C. to 115° C. whereby the salt cations replace alkali metal cations.

26. A new article of manufacture consisting of uniformly 2 substituted glucopyranose polymers in which cations which have replaced the hydroxyl hydrogen on carbons in the 2 position are cations derived from salts other than heavy metal salts.

27. A new article of manufacture consisting of alkali metal substituted glucopyranose polymers in which the alkali metal cations are uniformly substituted in the 2 position.

28. A new article of manufacture consisting of uniformly 2 substituted starchate of an alkali metal.

29. A new article of manufacture consisting of uniformly 2 alkyl substituted glucopyranose polymers in which the longest straight chain of the alkyl group is not more than 4 carbon atoms.

30. A method of making uniformly 2 substituted glucopyranose polymers comprising reacting at a temperature in the range of approximately 78° C. to 115° C. in a non-aqueous system, 2 mono alkali metal glucopyranose polymers with ethyl trichloroacetate whereby alkali metal is removed as alkali metal chloride and the ethyl chloroacetate is joined to the glucopyranose polymer through the bond which was attached to the removed chlorine atom prior to reaction.

31. A method of making uniformly 2 substituted glucopyranose polymers comprising reacting at a temperature in the range of approximately 78° C. to 115° C. in a non-aqueous system, 2 mono alkali metal glucopyranose polymers with ethylene chloride whereby the ethylene radical is bonded to glucopyranose polymer in place of alkali metal cations.

32. A method of making uniformly 2 substituted glucopyranose polymers comprising reacting at a temperature in the range of approximately 78° C. to 115° C. in a non-aqueous system, 2 mono alkali metal glucopyranose polymers with ethyl mono chloro acetate whereby the ethyl radical replaces alkali metal cations.

KENNETH M. GAVER.

REFERENCES CITED

The following references are of record in the file of this patent:

UNITED STATES PATENTS

| Number | Name | Date |
|---|---|---|
| 1,350,820 | Lilienfeld | Aug. 24, 1920 |
| 2,148,951 | Maxwell | Feb. 28, 1939 |
| 2,157,083 | Peterson | May 2, 1939 |
| 2,389,771 | Gaver | Nov. 27, 1945 |
| 2,397,732 | Gaver | Apr. 2, 1946 |

FOREIGN PATENTS

| Number | Country | Date |
|---|---|---|
| 397,293 | Great Britain | Aug. 24, 1933 |